Figure 1:
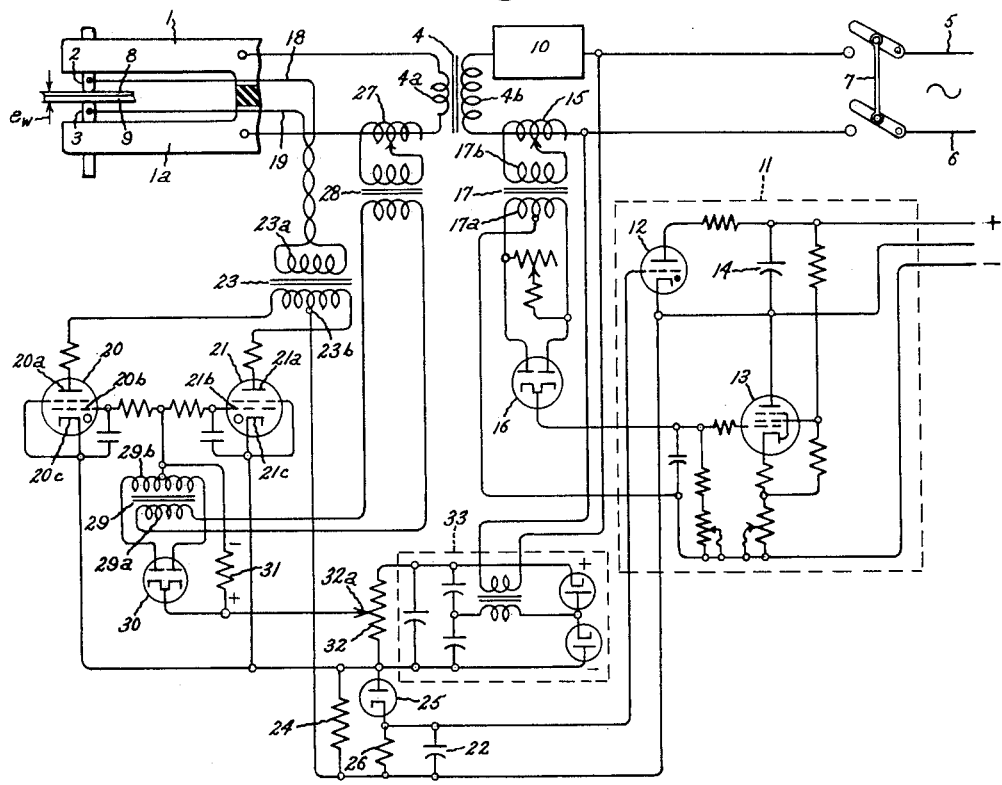

Oct. 25, 1960  H. F. STORM ET AL  2,958,044
VOLTAGE MEASURING SYSTEM

Filed Jan. 8, 1954  2 Sheets-Sheet 2

Inventor:
Herbert F. Storm,
Orrin W Livingston,
by *Irving H. Marshman*
Their Attorney.

United States Patent Office 2,958,044
Patented Oct. 25, 1960

2,958,044

VOLTAGE MEASURING SYSTEM

Herbert F. Storm, Delmar, and Orrin W. Livingston, Scotia, N.Y., assignors to General Electric Company, a corporation of New York Filed Jan. 8, 1954, Ser. No. 402,969

10 Claims. (Cl. 328—151)

This invention relates to measuring systems and more particularly to measuring systems intended for use in or in combination with systems for controlling apparatus or machines and it has for an object the provision of a simple, reliable and improved measuring system of this character.

A further object of the invention is the provision of means for obtaining a measurement of the resistive component of an alternating voltage which contains both resistive and reactive components.

In certain industrial applications it is desirable for operational reasons to obtain a measurement of the resistance of a portion of an alternating current circuit carrying a heavy current. For example, in resistance welding the electrical resistance of the weld itself during the welding operation is an important quantity which can be used to determine and to control the quality of a weld. The resistance $r_w$ of a weld can be obtained by measuring the voltage $e_w$ across the electrodes of the welder and dividing $e_w$ by the current $i_w$ through the electrodes. The division may be accomplished by supplying these two quantities to a quotient circuit. It is not difficult to obtain and supply to such quotient circuit the welding current or a voltage which is proportional to it. However, obtaining the welding voltage or a voltage proportional thereto presents some difficulties. In order to provide for the utilization of the full opening of the throat of the welding machine to the admission and positioning of large work pieces between the welding electrodes, it is essential that the leads of the electrical connections for deriving the weld voltage $e_w$ from the welding electrodes be untwisted and separated from each other. When so separated they form a loop in the alternating magnetic field which is produced by the welding current, and since the welding current may be of the order of many thousands of amperes, a voltage is induced in such connections which is many times greater than the weld voltage $e_w$ itself which is to be measured. The voltage at the output terminals of the loop would, therefore, not be a true or accurate measure or indication of the weld voltage $e_w$. Consequently, a further object of the invention is the provision of means for eliminating the effects of the voltage of mutual induction in the voltage deriving leads so that the measurement obtained will be a true and accurate measurement of the voltage across a voltage drop device in an alternating current circuit of which one example is the voltage across a weld in a resistance welding circuit.

In carrying the invention into effect in one form thereof, connections are provided for deriving from an alternating current circuit a voltage equal to or proportional to the voltage across a selected portion of the circuit such as a voltage drop device included in such circuit. The voltage so derived is supplied to the anode cathode circuit of an electric valve. Connections are also provided for deriving from the alternating current of the circuit an alternating voltage which is in quadrature with the current and for supplying such quadrature voltage to the control electrode and cathode of the valve to initiate its conduction at the instant of maximum value of the alternating current. At the instant of maximum value, the rate of change of the current is zero and therefore zero voltage is at such instant induced in the leads of the voltage deriving connections. Consequently, no component of mutual induction is present in the output voltage of the valve at this instant and it contains only the voltage derived from the voltage across the voltage drop device.

Figure 2:
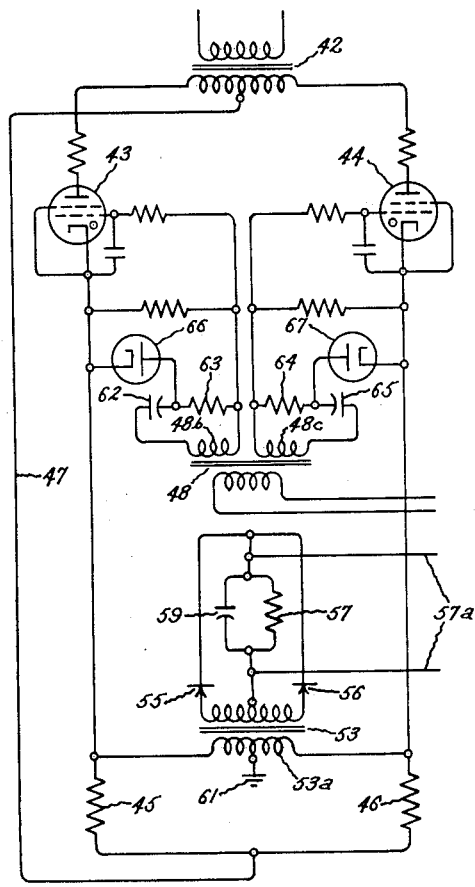
Figure 4:
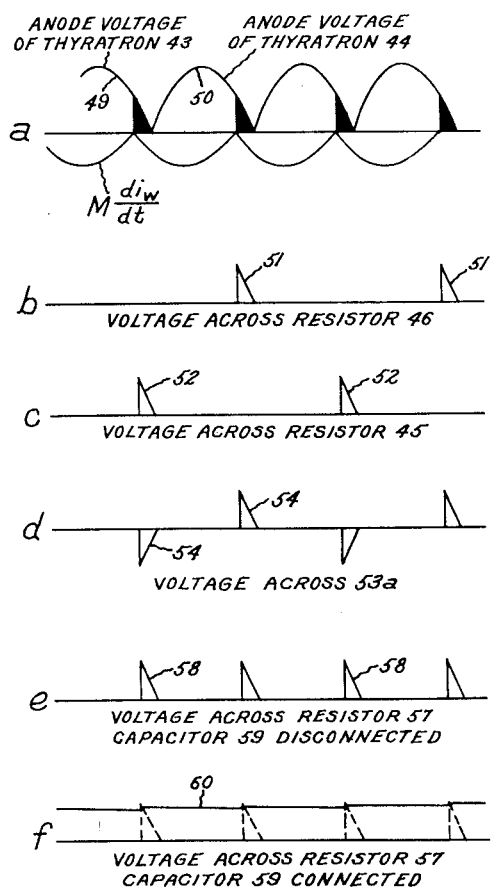

For a better and more complete understanding of the invention, reference should now be had to the following specification and to the accompanying drawing of which Fig. 1 is a simple diagrammatical sketch of an embodiment of the invention, Fig. 2 is a modification and Figs. 3 and 4 are charts of characteristic curves which facilitate an understanding of the invention and its operation.

Referring now to the drawing, the throat of a resistance welding machine is represented by the two parallel structural members 1 and 1a which are insulated from each other. Mounted in the arms 1 and 1a and near their extremities are two welding electrodes 2 and 3. These welding electrodes are included in series relationship in an alternating current resistance welding circuit which is supplied with alternating voltage from the secondary winding 4a of a welding transformer 4 of which the primary winding 4b is supplied from a suitable source of alternating voltage such as the supply conductors 5 and 6. A suitable switching device 7, conventionally represented as a single throw, double pole switch serves to provide for completing the connections of the primary winding 4b to the source 5, 6. Two metal plates 8 and 9 are positioned in the throat of the welding machine and are clamped between the welding electrodes preparatory to a welding operation. When the switch 7 is closed, the supply of welding current to the welding circuit is controlled by means of an automatic timed ignitron contactor control system 10 which constitutes no part of the present invention and which is therefore illustrated conventionally in the drawing.

For the purpose of monitoring and determining the quality of the weld, means are provided for measuring its resistance. These means are illustrated as a quotient circuit 11 to which is supplied a signal voltage which is equal to or is proportional to the voltage across the welding electrodes 2 and 3 and a second signal voltage which is proportional to the current of the welding circuit. The quotient circuit is illustrated as comprising a gaseous triode valve 12, a pentode high vacuum type valve 13 and a capacitor 14 connected as illustrated in Fig. 1. This quotient circuit per se is disclosed and claimed in application S.N. 316,841 filed October 25, 1952, Patent No. 2,740,044 by Herbert F. Storm and assigned to the assignee of the present invention. Since this quotient circuit per se does not constitute part of the present invention, a detailed explanation is omitted. It is sufficient for the purposes of the present invention to understand that a signal voltage equal to or proportional to the voltage across the weld is supplied to the control electrode and cathode of the gaseous triode valve 12, that a voltage proportional to the welding circuit current is supplied to the control electrode and cathode of the pentode valve 13 and that a voltage proportional to the quotient of these two signal voltages appears across the capacitor 14. Thus the voltage across the capacitor is a measure of the resistance of the weld and this measurement is useful in determining its quality.

The voltage proportional to welding current is derived from the welding circuit by means of a current transformer of which one of the supply conductors in the primary circuit of the welding transformer constitutes its primary winding and the coil 15 which surrounds such supply conductor is its secondary winding. This derived voltage is rectified by means of a diametric full wave rectifier which is illustrated as a twin diode electric valve 16 of which the anodes are connected to opposite terminals of the center tapped secondary winding 17a of an anode transformer 17 of which the primary winding 17b is supplied from the secondary winding of the current transformer. The rectified output voltage of the rectifier is supplied to the control electrode and cathode of the pentode valve 13.

The voltage proportional to the weld voltage $e_w$ is derived therefrom by means of leads 18 and 19 and is rectified by means of a diametric full wave rectifier which comprises thyratron valves 20 and 21. The rectified output voltage of this rectifier is utilized to charge a capacitor 22 and the voltage across the capacitor is supplied to the cathode and control electrode of the triode valve 12 of the quotient circuit.

In order that the throat of the welding machine may be utilized to the maximum extent it is necessary that the voltage deriving means 18 and 19 be untwisted and separated from each other for the full length of the throat to permit the positioning of large work pieces between its arms. Consequently, the leads 18 and 19 together with the welding electrodes and work pieces 8 and 9 constitute a closed loop in the field of the alternating flux which is produced by the alternating welding current. Since the welding current is of the order of thousands of amperes, the voltage of mutual induction which is induced in the leads 18 and 19 is many times larger than the voltage $e_w$ across the weld. Consequently, the total voltage of the loop which is supplied to the primary winding 23a of transformer 23 is not a true or accurate measure of the voltage $e_w$ across the weld.

In order to eliminate the effect of the mutual induction voltage component from the voltage which is supplied to the cathode and control electrode of triode valve 12, means are provided for firing the thyratron valves only at the instant when the welding current is maximum. At this instant the rate of change of welding current is zero and consequently the voltage component which is due to mutual induction is also zero.

As shown, the anodes 20a and 21a of the thyratrons 20 and 21 are connected to opposite terminals of the secondary winding of the anode transformer 23 and the cathodes 20b and 21b are connected through a load resistor 24 to the center tap 23b of the secondary winding to complete a diametric full wave rectifier connection. Across the load resistor 24 is connected a parallel circuit which includes a diode rectifier valve 25 and the capacitor 22 connected in series relationship together with a resistor 26 which is connected in parallel with the capacitor.

To provide a voltage in quadrature with the welding current for firing the thyratrons at the instant of zero rate of change of the current, a current transformer is provided of which one of the welding current supply conductors constitutes the primary winding and the coil 27 constitutes the secondary winding. The secondary winding 27 is connected through a transformer 28 to the primary winding 29a of a control electrode transformer 29. Preferably, the transformer 28 is of the type of which the magnetizing current is large in comparison with its load current, i.e. of the order of 10:1 or greater. This form of loading of the current transformer insures that the voltage induced in the secondary winding of transformer 29 will be substantially in quadrature with the primary current of the welding transformer.

The voltage which is induced in the secondary winding 29b is rectified by means of a diametric full wave rectifier in the form of a double diode electric valve 30 of which the anodes are connected to opposite terminals of the secondary winding and the common cathode is connected through a loading resistor 31 to the center tap of the secondary winding 29a. Both control electrodes 20b and 21b of the thyratrons are connected to the negative terminal of the resistor 31 and the cathodes 20c and 21c are connected through the active portion of a potentiometer 32 to the positive terminal of the resistor 31. Direct voltage is supplied to the potentiometer 32 from a suitable source such as the voltage doubler 33 which in turn is supplied from the supply conductors 5 and 6 when the switch 7 is in its closed position.

With the foregoing understanding of the elements and their organization, the operation of the system to obtain a signal voltage which is equal to or proportional to the voltage $e_w$ across the weld and which does not contain any component of mutual induction will readily be understood from the following detailed description.

To energize the apparatus preparatory to welding operations, the switch 7 is closed. Following its closing, welding operations are carried out under the control of the timing and sequencing control system 10 which determines the magnitude of the welding current and automatically determines the welding period, i.e. the period during which current is supplied to the primary of the welding transformer.

The welding current $i_w$ which during a welding operation flows in the secondary circuit of the welding transformer is represented by the sinusoidal curve 34 in Fig. 3b and the voltage $e_w$ across the weld which is substantially in phase with the welding current is represented by the sinusoidal curve 35. Owing to the unavoidable separation of the voltage deriving leads 18 and 19 to form a loop in the high field intensity alternating flux field produced by the welding current, a large voltage of mutual induction is induced in the conductors 18 and 19. At any instant this voltage of mutual induction is equal to $$M\frac{di_w}{dt}$$

in which M is the coefficient of mutual induction and $$\frac{di_w}{dt}$$

is the rate of change of welding current. It is represented in Fig. 3a by the sinusoidal curve 36 which leads the welding current $i_w$ and the voltage $e_w$ across the weld by 90°. The voltage $e_a$ which is supplied to the anodes of the thyratrons is the vector sum of the resistive component voltage $e_w$ and the mutual induction component $$M\frac{di_w}{dt}$$

and is represented in Fig. 3a by the sinusoidal curve 37 which leads the resistive component $e_w$ by an amount less than 90°. As indicated in Fig. 3a, the voltage $e_a$, owing to its component of mutual induction voltage, is much larger than the resistive component. In actual practice it might be several times larger than the resistive component $e_w$, i.e. the voltage across the weld which it is desired to derive and supply to the quotient circuit and consequently cannot be used as a measure of $e_w$.

However, at the instant of maximum value of the weld current $i_w$, its rate of change is zero and the voltage of mutual induction at this instant is also zero. Consequently, at this instant the voltage $e_a$ contains zero component of mutual induction voltage and is therefore equal to the resistive component $e_w$, i.e. the voltage across the weld. Thus, if each of the thyratrons 20 and 21 is fired at this instant in each positive half cycle of its anode voltage $e_a$, the maximum or peak value of its output voltage which is supplied across the output circuit resistor 24 will be proportional to its maximum value.

In order to fire the thyratrons at the instant of zero rate of change of current, the voltage which is derived from the welding current $i_w$ by the welding transformer is rectified and supplied to the control electrode circuit of the thyratrons. The result is illustrated graphically by the characteristic curves in Fig. 3c in which the half wave sinusoidal curves 38 represent successive positive half cycles of the voltage supplied to the anode of the thyratron 20 and the curves 39 represent successive positive half cycles of the voltage which is supplied to the anode of thyratron 21. The voltage $e_c$ which is derived from the welding current by the current transformer and rectified by the double diode valve 30 is represented by the curve 40 of Fig. 3c which illustrates a full wave rectified voltage which is supplied to the control electrodes of the thyratrons 20 and 21. As indicated in Fig. 3c, the connections from the transformer 29 to the control electrodes are poled so that the voltages supplied to the control electrodes are negative. Thus the voltage supplied to the control electrodes becomes sufficiently less negative to fire the thyratrons during their positive half cycles of anode voltage only at the instant when it becomes zero. Since this voltage is in quadrature with the welding current $i_w$ its zero value occurs at the instant of maximum value and zero rate of change of the welding current. At this instant, as previously pointed out, the mutual induction component of the anode voltage is zero and the peak value of the voltage which is supplied to the output circuit resistor 24 is proportional to the maximum value of the voltage $e_w$ across the weld. The peak value of the voltage supplied to resistor 24 occurs at the instant of firing the thyratrons and is represented by the ordinates 38a and 39a of the positive half cycles 38 and 39 of anode voltage of Fig. 3c. This peak voltage across the resistor 24 is supplied through the diode rectifier 25 to the capacitor 22 and causes the capacitor to charge to such peak voltage. The rectifier 25 prevents the capacitor from discharging as the voltage across the resistor decreases from its peak value to zero in the portion of each half cycle of anode voltage which is represented by the shaded areas of Fig. 3c.

Following the charging of the capacitor 22 in each half cycle to the peak voltage 38a or 39a, the capacitor discharges a slight amount through the parallel high resistance resistor 26 in accordance with the curve 41 of Fig. 3c. However, its average value like its peak value is proportional to the maximum value of the voltage $e_w$ across the weld. Thus, there is supplied to the input circuit of the valve 12 of the quotient circuit a direct voltage which is entirely free from the mutual induction component voltage which is induced in the leads 18 and 19 by the welding current. Since the voltage which is supplied to the input circuit of the valve 13 is proportional to the welding current $i_w$ the quotient circuit operates to produce at its output terminals a voltage which is proportional to the quotient of $$\frac{e_w}{i_w}$$

and which is therefore an accurate measure of the resistance $r_w$ of the weld.

The transformer 23 may produce a slight shift in phase of the anode voltage $e_a$ with the result that the firing point of the thyratrons will not occur exactly at the instant of maximum value of the welding current. This inaccuracy can be cancelled by moving the slider 32a on the potentiometer 32 to include in the cathode to control electrode circuit voltage of the thyratrons a constant component of direct voltage to advance or retard the firing point of the thyratrons the required amount.

In the modification shown in Fig. 2, the transformer 42 corresponds to the transformer 23 and the thyratrons 43 and 44 correspond to the thyratrons 20 and 21 of Fig. 1. Individual resistors 45 and 46 are connected in series in the cathode circuits of the thyratrons 43 and 44 respectively and their common terminal is connected through conductor 47 to the center tap of the secondary winding of anode transformer 42 to provide a diametric full wave rectifier connection.

The input transformer 48 corresponds to the input transformer 29 of Fig. 1 and its primary winding is supplied with a voltage which is derived from the welding current to cause the thyratrons to fire at the instant of maximum value of the welding current of which firing points are represented by the peak values of the shaded areas of the anode voltages 49 and 50 of thyratrons 43 and 44 as shown in Fig. 4a.

As a result of the conduction of the thyratrons the voltage drop which appears across resistor 46 is represented by the discontinuous curve 51 of Fig. 4b and the voltage drop which appears across resistor 45 is represented by the discontinuous curve 52 of Fig. 4c. These voltages are transformed by an isolating transformer 53 of which the primary winding 53a is connected across the cathode terminals of resistors 45 and 46, and thus the voltage which appears across the terminals of its secondary winding is an alternating voltage which is represented by the curve 54 which is illustrated in Fig. 4d. The opposite terminals of the secondary winding are connected through half wave rectifiers 55 and 56 and resistor 57 to the center tap of the secondary winding to provide a diametric full wave rectifier connection.

As a result of this connection the voltage which appears across resistor 57 is a full wave rectified voltage such as represented by curve 58 of Fig. 4e. Preferably, a capacitor 59 is connected across the resistor 57. The voltage across the capacitor 59 is represented by the curve 60 of Fig. 4f. Like the voltage across capacitor 22 of Fig. 1 it contains zero mutual induction component and is proportional to the maximum value of the resistive component voltage across the weld. By means of conductors 57a it is supplied to the input circuit of a quotient or other measuring circuit. An advantage of the modification of Fig. 2 is that its circuitry is insulated from the quotient circuit by means of the isolating transformer 53 and may therefore be grounded as at the point 61 without regard to the presence of ground connections in the quotient circuit.

The phase shift of the anode voltage which is supplied to the anodes of thyratrons 43 and 44 may be compensated in the same manner as in the modification of Fig. 1, i.e., the inclusion of a constant component of direct voltage of adjustable magnitude in the cathode to control electrode circuits of the thyratrons such as is accomplished by movement of the slider 32a on potentiometer 32 in Fig. 1. Alternatively, this unwanted phase shift may be compensated for by the phase shift circuit illustrated in Fig. 2 in which the capacitor 62 and the resistor 63 are connected in series relationship across the secondary winding 48b of the input transformer and the resistor 64 and capacitor 65 are connected in series relationship across the secondary winding 48c of the input transformer. The cathode to control electrode circuit of the thryratron 43 is thus completed through the diode rectifier valve 66 to the junction point of the capacitor and resistor of the phase shift circuit and through the resistor 63 to the control electrode. Similarly, the diode rectifier valve 67 is connected in circuit between the cathode of thyratron 44 and the junction point of resistor 64 and capacitor 65 of the phase shift circuit. Thus there is introduced into the cathode to control electrode circuit of each of the thyratrons 43 and 44 a phase shift in the control electrode voltage of appropriate magnitude to compensate for the phase shift introduced by the anode transformer. The amount of this phase shift is determined by the capacitance and resistance of the capacitors 62 and 65 and the resistors 63 and 64.

Although in accordance with the provisions of the patent statutes this invention is described as embodied in concrete form and the principle thereof has been described together with the best manner in which it is now contemplated applying that principle it will be understood that the apparatus shown and described is merely illustrative and that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. For use in measuring the resistance of a voltage drop device included in an alternating current circuit, the combination of an electric valve provided with an anode, a cathode, and a control electrode, connections for deriving from said circuit the voltage across said device and for supplying said derived voltage to the anode-cathode circuit of said valve, a load device included in said anode-cathode circuit, connections for deriving from the current of said alternating current circuit and supplying to the cathode to control electrode circuit of said valve a signal voltage substantially in quadrature with said current for initiating conduction in said valve at the instant of zero rate of change of said current, and means for indicating the peak value of the voltage across said load device at said instant.

2. For use in measuring the resistance of a voltage drop device included in an alternating current circuit, the combination of an electric valve provided with an anode, a cathode and a control electrode, connections for deriving from said circuit the voltage across said device and for supplying said derived voltage to the anode-cathode circuit of said valve, connections for deriving from the current of said circuit and supplying to the cathode to control electrode circuit of said valve a periodically varying voltage in quadrature with said current to initiate conduction of said valve at the instant of zero rate of change of said current, a capacitor and connections from the anode-cathode circuit of said valve for charging said capacitor to the peak value of the voltage derived from said voltage drop device at the instant of initiation of conduction of said valve.

3. For use in measuring the resistance of a voltage drop device included in an alternating current circuit, the combination of an electric valve provided with an anode, a cathode and a control electrode, connections for deriving from said circuit the voltage across said device and for supplying said derived voltage to the anode-cathode circuit of said valve, load current responsive means for deriving from the current of said circuit and supplying to the control electrode to cathode circuit of said valve a periodically varying voltage in quadrature with said current to initiate conduction of said valve at the instant of zero rate of change of said current, a capacitor and connections from the anode-cathode circuit of said valve for charging said capacitor to a voltage proportional to the peak value of the voltage derived from said voltage drop device at the instant of initiation of conduction of said valve.

4. For use in measuring the resistance of a voltage drop device included in an alternating current circuit, the combination of an electric valve provided with an anode, a cathode and a control electrode, connections for deriving from said circuit the voltage across said device and for supplying said derived voltage to the anode-cathode circuit of said valve, connections including a current transformer for deriving from the current of said circuit and supplying to the cathode to control electrode circuit of said valve an alternating voltage to initiate conduction therein at the instant of zero rate of change of said current, a load device in said anode-cathode circuit, a capacitor, and connections from said load device for charging said capacitor to a value proportional to the peak value of the alternating voltage across said load device at the instant of initiation of conduction of said valve.

5. For use in measuring the resistance of a voltage drop device included in an alternating current circuit, the combination of an electric valve provided with an anode, a cathode and a control electrode, connections for deriving from said circuit the alternating voltage across said device and for supplying said derived voltage to the anode-cathode circuit of said electric valve, means including a current transformer for deriving from the current of said circuit and supplying to the cathode to control electrode circuit of said electric valve an alternating voltage for rendering said valve conducting at the instant of zero rate of change of said current, a capacitor, a resistor connected in the anode-cathode circuit of said valve, and connections from said resistor to said capacitor for charging said capacitor to the peak voltage across said resistor at the instant of initiation of conduction of said valve.

6. For use in measuring the resistance of a voltage drop device included in an alternating current circuit, the combination of an electric valve having an anode, a cathode and a control electrode, connections including a first transformer having its primary winding connected across said device for deriving a voltage therefrom and having its secondary winding connected to supply said derived voltage to the anode-cathode circuit of said valve, a current transformer connected in said circuit for deriving from the current thereof an alternating voltage approximately in quadrature with said current, a full wave rectifier connected to be supplied from said current transformer for providing a rectified pulsating voltage, connections for supplying said pulsating voltage to the cathode to control electrode circuit of said valve with said voltage negative toward said control electrode thereby to initiate conduction of said valve at the instant of zero rate of change of said current, means for compensating for the error in the firing time of said valve resulting from the shift in phase of the voltage supplied to said anode-cathode circuit by said first transformer comprising a source of direct voltage and connections for deriving from said source and supplying to said cathode to control electrode circuit a component of direct voltage poled to effect a phase shift of the firing point of said valve substantially equal to the phase shift produced by said first transformer, a capacitor, and connections from the anode-cathode circuit of said valve to said capacitor for charging said capacitor to the peak voltage of said anode-cathode circuit at the instant of initiation of conduction of said valve.

7. For use in measuring the resistance of a voltage drop device included in an alternating current circuit, the combination of an electric valve having an anode, a cathode and a control electrode, connections including a first transformer having its primary winding connected across said device for deriving a voltage therefrom and having its secondary winding connected to supply said derived voltage to the anode-cathode circuit of said valve, a current transformer connected in said circuit for deriving from the current thereof an alternating voltage approximately in quadrature with said current, a full wave rectifier connected to be supplied from said current transformer for providing a rectified pulsating voltage, connections for supplying said pulsating voltage to the cathode to control electrode circuit of said valve with said voltage negative toward said control electrode thereby to initiate conduction of said valve at the instant of zero rate of change of said current, means for compensating for the error in the firing time of said valve resulting from the shift in phase of the voltage supplied to said anode-cathode circuit by said first transformer comprising a source of direct voltage and connections for deriving from said source and supplying to said cathode to control electrode circuit a component of direct voltage poled to effect a phase shift of the firing point of said valve substantially equal to the phase shift produced by said first transformer, a capacitor, a first resistor connected in the anode-cathode circuit of said valve, connections from said resistor to said capacitor for charging said capacitor to the peak voltage produced across said resistor, a rectifier valve included in said last-mentioned connections poled to conduct charging current to said capacitor and to prevent discharge of said capacitor into said resistor, and a second resistor of relatively high resistance with respect to said first resistor connected directly in parallel with said capacitor.

8. For use in measuring the resistance of a voltage drop device included in an alternating current circuit, the combination of a pair of electric valves, each provided with an anode, a cathode and a control electrode, connections for deriving from said circuit the alternating voltage across said device and for supplying said derived voltage to the anode-cathode circuits of said electric valves, means including a current transformer for deriving from the current of said circuit an alternating voltage approximately in quadrature with said current, a first rectifier supplied from said current transformer and connected to supply a pulsating half wave voltage to the control electrode of a first of said valves to render said first valve conducting at an instant of zero rate of change of said current, a second rectifier supplied from said current transformer and connected to supply a pulsating half wave voltage to the control electrode of said second valve to render said second valve conducting at an instant of zero rate of change of said current, a resistor connected in the cathode circuit of said first valve, a second resistor connected in the cathode circuit of the other of said valves to render it conducting at the next succeeding instant of zero rate of change of said current, a control transformer having its primary winding connected across the cathode terminals of said resistors and provided with a ground connection, a capacitor and full wave rectifying means supplied from the secondary winding of said control transformer for supplying to said capacitor a rectified voltage proportional to the peak value of the voltage supplied by said valves to said control transformer at said instants of zero rate of change of said current.

9. For use in measuring the resistance of a voltage drop device connected in an alternating current circuit, the combination of a pair of electric valves each provided with an anode, a cathode and a control electrode, connections for deriving from said circuit the alternating voltage across said device and for supplying said derived voltage to the anode-cathode circuits of said valves, comprising a potential transformer having a primary winding connected across said device and a midtapped secondary winding having one terminal connected to the anode of one of said valves and its opposite terminal connected to the anode of the other of said valves, a cathode circuit connection from the cathode of each of said valves to the midtap of said secondary winding, means including a current transformer for deriving from the current of said alternating current circuit an alternating voltage in quadrature with said current, a transformer having a primary winding supplied with said quadrature voltage and two secondary windings each connected to the cathode control electrode circuit of a corresponding one of said valves, a half wave rectifier connected in each of said cathode control electrode circuits for supplying to the control electrodes of each of said valves a rectified half wave voltage in phase opposition to the anode voltage for rendering each of said valves conducting at the instant of zero rate of change of said current, a separate resistor connected in the cathode circuit connection of each of said valves, a control transformer having a grounded center tap primary winding and a secondary winding, a capacitor and full wave rectifying means supplied from said control transformer secondary winding for charging said capacitor to a voltage proportional to the peak value of said voltage supplied by said valves to said control transformer at said instants of zero rate of change of current.

10. For use in measuring the resistance of a voltage drop device included in an alternating current circuit, the combination of an electric valve provided with an anode, a cathode and a control electrode, connections including a potential transformer for deriving from said circuit the voltage across said device and for supplying said derived voltage to the anode-cathode circuit of said valve, connections for deriving from the current of said circuit an alternating voltage in quadrature with said current, means for rectifying said quadrature voltage and for supplying a half wave rectified voltage to said cathode and control electrode, a resistance reactance phase shifting network included in circuit with said rectifying means for effecting a phase shift of said rectified voltage to compensate for the phase shift produced by said potential transformer of the voltage supplied to said anode thereby to initiate conduction of said valve at the instant of zero rate of change of said current, a capacitor and connections from the anode-cathode circuit of said valve for charging said capacitor to a voltage proportional to the value of the voltage derived by said potential transformer at the instant of zero rate of change of said current.

References Cited in the file of this patent
UNITED STATES PATENTS

| | | |
|---|---|---|
| 2,175,017 | Cockrell | Oct. 3, 1939 |
| 2,404,643 | Livingston | July 23, 1946 |
| 2,494,340 | Leigh | Jan. 10, 1950 |
| 2,529,111 | Steinberger | Nov. 7, 1950 |
| 2,694,762 | Ruetschi | Nov. 16, 1954 |